(12) United States Patent
Ma

(10) Patent No.: US 11,008,080 B1
(45) Date of Patent: May 18, 2021

(54) ELECTRONIC DEVICE AND SYSTEM AND METHOD FOR DIVING

(71) Applicant: SHENZHEN ZHILAN TECHNOLOGY CO., LTD., Shenzhen (CN)

(72) Inventor: Kui Ma, Guangdong (CN)

(73) Assignee: SHENZHEN ZHILAN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/679,159

(22) Filed: Nov. 9, 2019

(30) Foreign Application Priority Data

Oct. 29, 2019 (CN) .......................... 201911038459.X

(51) Int. Cl.
| | |
|---|---|
| *B63C 11/34* | (2006.01) |
| *E21B 41/04* | (2006.01) |
| *B63C 11/26* | (2006.01) |
| *G01S 15/42* | (2006.01) |
| *H04B 11/00* | (2006.01) |
| *B63C 11/02* | (2006.01) |

(52) U.S. Cl.
CPC .............. *B63C 11/26* (2013.01); *G01S 15/42* (2013.01); *H04B 11/00* (2013.01); *B63C 2011/021* (2013.01)

(58) Field of Classification Search
CPC ... B63C 11/26; B63C 2011/021; B63C 11/34; G01S 15/42; H04B 11/00; B63G 2008/002; B63G 2008/005; B63G 2008/007; E21B 41/04
USPC .................................................. 405/190, 191
See application file for complete search history.

(56) References Cited

U.S. PATENT DOCUMENTS

| | | | | |
|---|---|---|---|---|
| 4,835,716 | A * | 5/1989 | Tamaki .................... | B63C 11/32 368/14 |
| 2004/0068371 | A1* | 4/2004 | Estep ........................ | G01S 5/18 701/468 |
| 2007/0162254 | A1* | 7/2007 | Hirose .................... | B63C 11/32 702/166 |
| 2012/0318188 | A1* | 12/2012 | Hudson .................... | B63G 8/22 114/333 |
| 2015/0071039 | A1* | 3/2015 | Rahkonen .............. | H04B 11/00 367/134 |
| 2016/0060887 | A1* | 3/2016 | Tryber .................. | E04H 4/1654 15/1.7 |

(Continued)

*Primary Examiner* — Edwin J Toledo-Duran

(57) ABSTRACT

A control method of an electronic device system for diving is provided. The control method includes steps of sending a positioning request signal to the slave device; receiving a feedback signal sent by the slave device, the feedback signal is generated by the slave device responding to the positioning request signal, the feedback signal includes water pressure data; according to the time difference between the sending time of the positioning request signal and the receiving time of the feedback signal, and the signal transmission speed, the relative distance with the slave device is calculated; obtaining the relative direction between the slave device and the master device according to the incoming direction of the feedback signal received by the ultrasonic receiver; calculating the relative depth with the slave device according to the water pressure data in the feedback signal. Furthermore, an electronic device and system for diving are also provided.

17 Claims, 8 Drawing Sheets

(56) References Cited

U.S. PATENT DOCUMENTS

2020/0055570 A1\* 2/2020 Brink .................... G05D 1/0692
2020/0142415 A1\* 5/2020 Oh ......................... G01V 11/00

\* cited by examiner

ELECTRONIC DEVICE AND SYSTEM AND METHOD FOR DIVING

CROSS REFERENCE TO RELATED APPLICATION

This non-provisional patent application claims priority under 35 U.S.C. § 119 from Chinese Patent Application No. 201911038459.X filed on Oct. 29, 2019, the entire content of which is incorporated herein by reference.

TECHNICAL FIELD

The disclosure relates to the field of underwater electronic technology, and in particular to an electronic device, system and control method for diving.

BACKGROUND

Generally, two or more people are needed to dive together for safety. Because of the barrier of sea water, the diver can't use the reference object to obtain his position and a relative distance between the diver and his partners. In case of any accident (such as no partner can be seen due to too far distance or poor visibility of sea water, washed away by sea current, up floating in the middle due to failure of breathing device, passive up floating or sinking due to poor buoyancy control, encounter with dangerous organisms such as sharks, etc.), the partners cannot determine their relative position, give warning or assist each other.

The general method to keep the distance between the partners is to connect "diving rope" between the partners. This method can only be used in the flat environment. Moreover, it can only be used by two divers. When multiple divers are diving at the same time or carrying out highly difficult diving projects (such as cave diving, shipwreck diving, underwater boulder diving, underwater city archaeology, etc.), the diving rope is prone to kink, pull, scratch, drag and other problems, even entangled on the diver's body or the diving breathing device such as the second stage of the gas cylinder, causing diving accident that may result in casualties. The general methods to enable the divers to communicate with each other underwater are using sign language, knocking gas cylinder, using signal rope, etc. Sign language is limited by the visibility of sea water, and the communication distance is usually less than 1 meter. When the environment is bad, the diver can't even see his own gestures; the gas cylinder can only be knocked at a very short distance, and the above methods can't reliably attract the attention of the other partners; the signal rope also has the above-mentioned problems, such as kink and drag and so on.

SUMMARY

The disclosure provides an electronic device, system and method for diving, which can meet the requirements of underwater communication of divers, determine the position of diving partners and ensure the safety of diving.

The first aspect of the disclosure provides a control method of an electronic device system for diving, the electronic device system for diving includes a master device and a slave device, the control method is characterized in that the control method is executed on the main equipment, and the control method includes:

Sending a positioning request signal to the slave device through an ultrasonic transmitting device;

Receiving a feedback signal sent by the slave device through a plurality of ultrasonic receivers, the feedback signal is generated by the slave device responding to the positioning request signal, the feedback signal includes water pressure data;

According to the time difference between the sending time of the positioning request signal and the receiving time of the feedback signal, and the signal transmission speed, the relative distance with the slave device is calculated;

Acquiring the relative direction between the slave device and the master device according to the incoming direction of the feedback signal received by the ultrasonic receiver;

Calculate the relative depth with the slave device according to the water pressure data in the feedback signal.

The second aspect of the disclosure provides an electronic device for diving, characterized in that the electronic device for diving is the master device, characterized in that the master device includes:

Transducer, including ultrasonic transmitter and a plurality of ultrasonic receivers.

Memory for storing executable computer programs.

A processor for executing the computer programs to realize the above control method.

The third aspect of the disclosure provides an electronic device system for diving, the electronic device system for diving includes the slave device and the master device.

The control method of the electronic device system for diving, the electronic device for diving and the electronic device system for diving can obtain the relative position information between the master device and the slave device through the ultrasonic signal of the transducer. Because of the stability of the ultrasonic signal spread in the underwater, the relative position between the master device and the slave device can be acquired accurately.

DETAILED DESCRIPTION OF THE EMBODIMENTS

This disclosure provides an electronic device, system and method for diving, which enables one of a number of the electronic devices for diving to obtain underwater position information and diving condition of other devices, and the person who carries the one electronic device can get someone who carries the other divers from danger in case of abnormal conditions, so as to improve the safety of diving.

Figure 1:
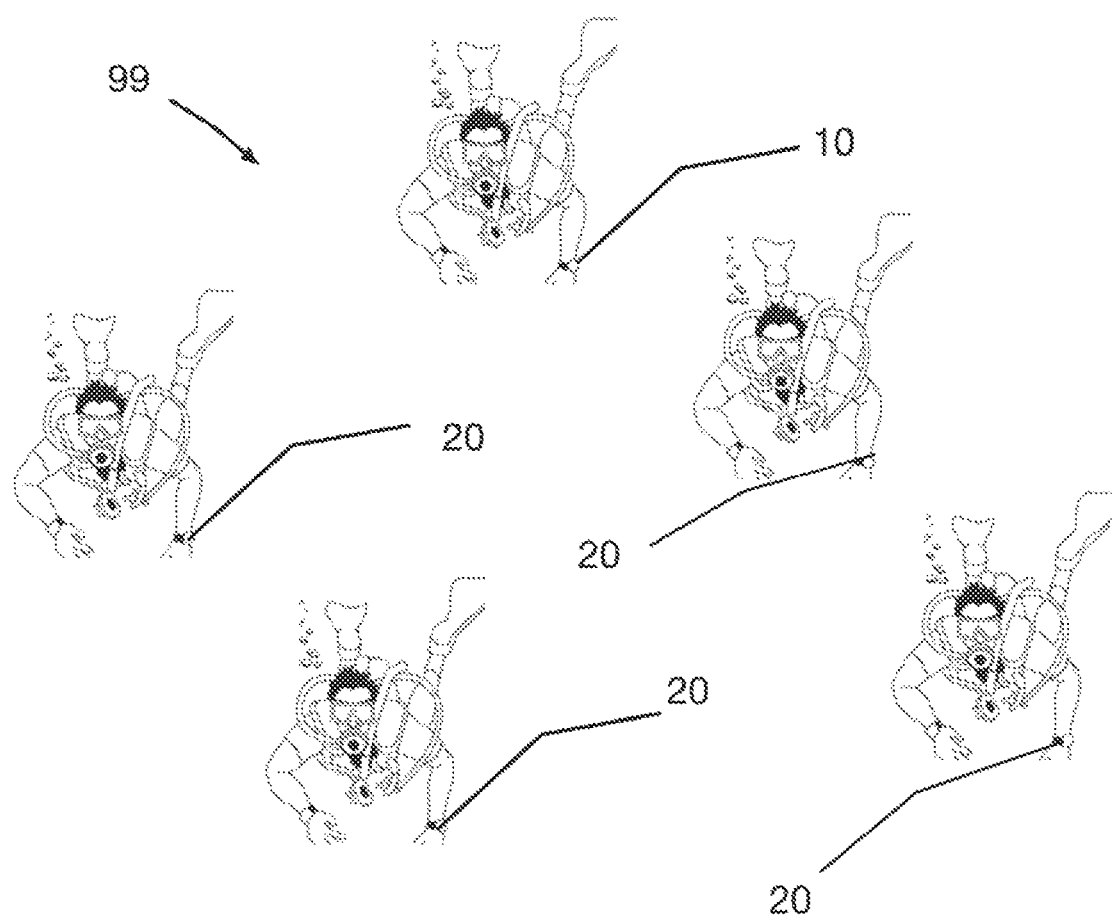
FIG. 1 illustrates an electronic device system for diving in accordance with an embodiment, and the electronic device system for diving includes a plurality of electronic devices for diving.

Referring to FIG. 1, FIG. 1 illustrates a drawing of an electronic device system 99 for diving. The electronic device system 99 for diving includes a plurality of electronic device for diving. In this embodiment, the electronic devices are divided into the master device 10 and the slave device 20 according to the roles played by the divers. In this embodiment, one master device 10 and four slave devices 20 are illustrated as examples.

Figure 2:
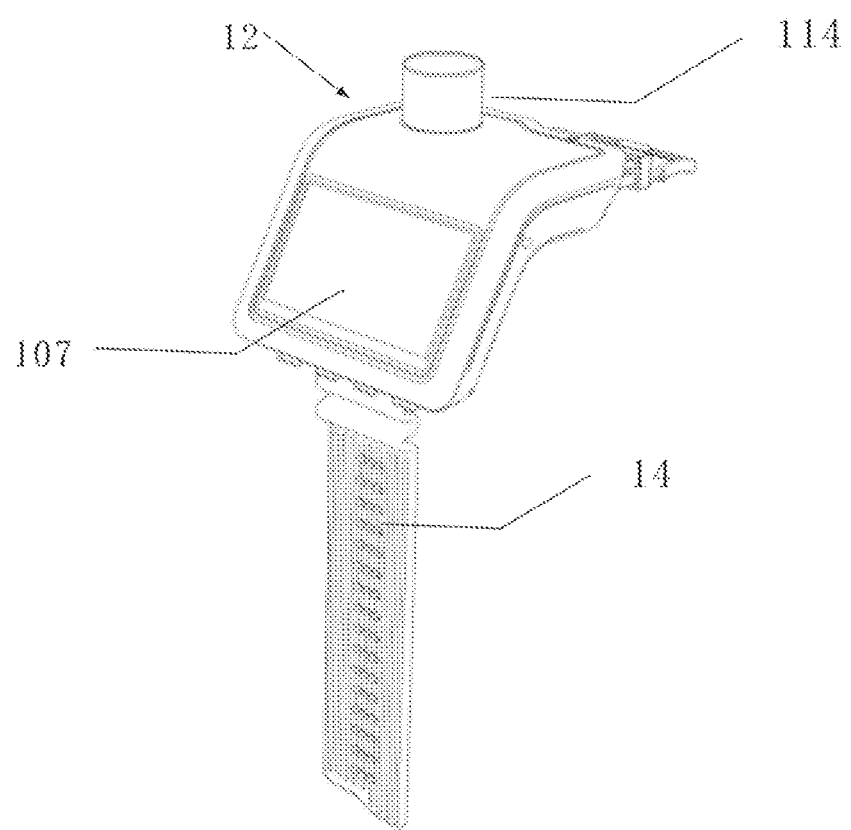
FIG. 2 illustrates an isometric drawing of an electronic device for diving in accordance with an embodiment.

Referring to FIG. 2, FIG. 2 illustrates an isometric drawing of the electronic device for diving. In this embodiment, the master device 10 is wearable. In detail, the master device 10 is suitable to wear on the wrist, and the appearance of the master device 10 is but not limited to a wristband, a watch, and so on. In some other embodiments, the master device 10 may also be suitable to be wore on the arm or the head, such as a glass. In some other embodiments, the master device 10 may also be suitable to be caught in the hand.

Figure 3A:
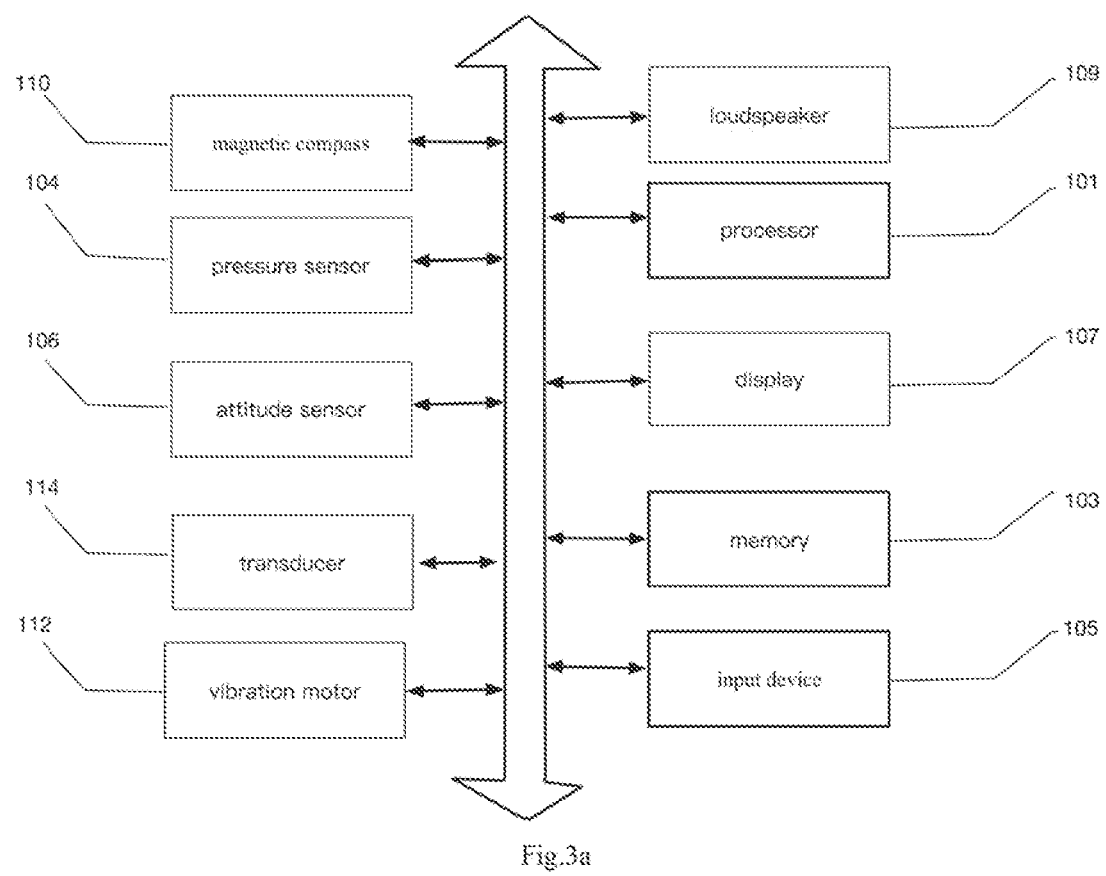
FIG. 3a to FIG. 3c illustrate a block diagram of electronic device for diving in accordance with an embodiment.

Referring to FIG. 3a, the master device 10 includes a main body 12, a tie 14, and a number of functional electronic devices arranged in the main body 12. In detail, the master device 10 also includes an input device 105, a display 107, a loudspeaker 109, a pressure sensor 104, an attitude sensor 106, a magnetic compass 110, a vibration motor 112, and a transducer 114. Furthermore, the display 107, the loudspeaker 109 and the vibration motor 112 can be regarded as output devices for generating prompt information, such as displaying information, speaking sound, generating vibration or other prompt information. The input device 105 may be but not limited to entity keys, buttons, push buttons, touch screen keys, etc.

The pressure sensor 104 is configured to detect a pressure applied to it. It is understood that, when the diver dives underwater, the pressure sensor 104 is configured to detect the water pressure and generate a data of the water pressure.

The attitude sensor 106 is configured to detect the gravity direction of the master device 10.

The magnetic compass 110 is configured to measure the magnetotelluric field.

Figure 4:
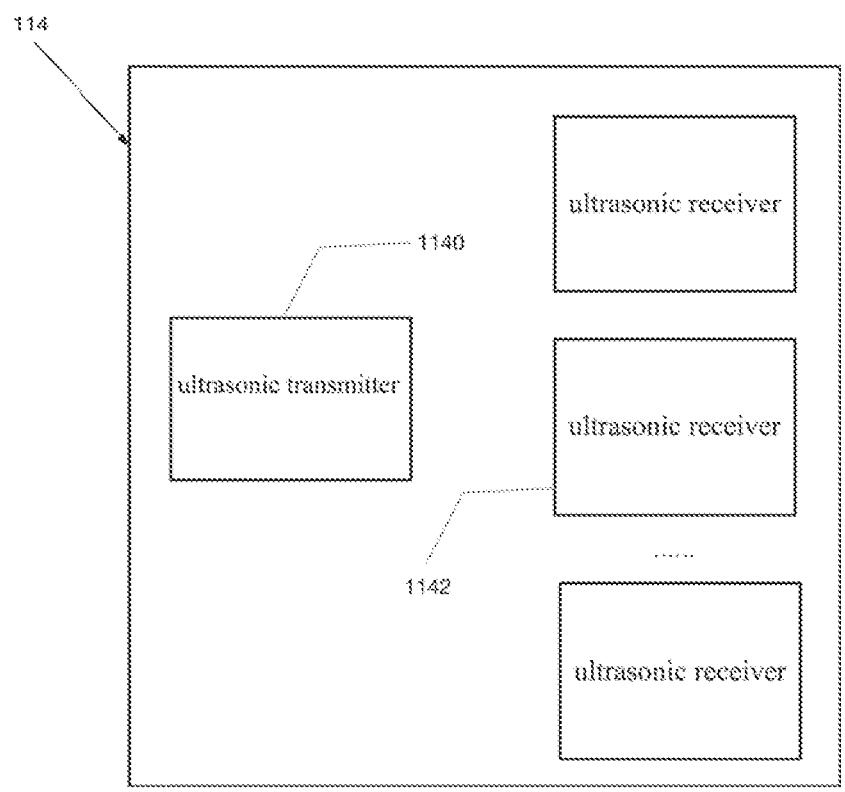
FIG. 4 illustrates a block diagram of a transducer of the electronic device for diving showing in FIG. 3a in accordance with an embodiment.

Referring to FIG. 4, the transducer 114 is configured to convert electrical signals into ultrasonic signals and transmit the ultrasonic signals via the ultrasonic transmitter 1140. The transducer 114 is also configured to receive the ultrasonic signals and convert the ultrasonic signals into electrical signals via the ultrasonic receivers 1142. The ultrasonic receivers 1142 are arranged in different directions.

Figure 3B:
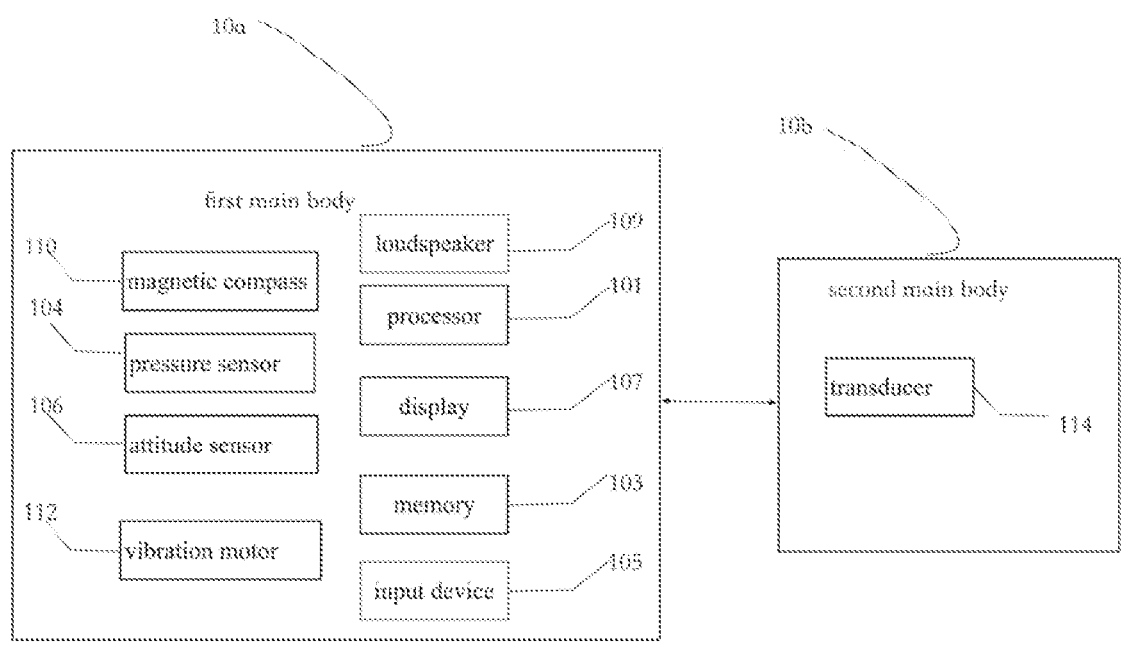

Referring to FIG. 3b, in some other embodiments, the master device 10 may not be a wearable device, which includes a first main body 10a and a second main body 10b communicated with the first main body 10a. In this embodiment, the first master device 10a and the second main body 10b are connected through a cable. In some other embodiments, the master device 10a and the second main body 10b may also be connected by wireless communication. Furthermore, the transducer 114 is arranged on the second body 10b. Other components, such as an input device 105, a display 107, a loudspeaker 109, a pressure sensor 104, an attitude sensor 106, a magnetic compass 110, a vibration motor 112 are arranged on the first main body 10a. When in use, the transducer 114 is immersed in water. The first main body 10a is completely out of the water. In some other embodiments, the second main body 10b may be provided with some other components besides the transducer 114, such as the magnetic compass 110, the pressure sensor 104, the attitude sensor 106, etc. It is understood that, the input device 105, the display 107, the loudspeaker 109, the vibration motor 112, and other output devices need to be located on the first main body 10a; the transducer 114 needs to be located on the second main body 10b; and other components can be selectively to be located on the first main body 10a and the second main body 10b.

Figure 3C:
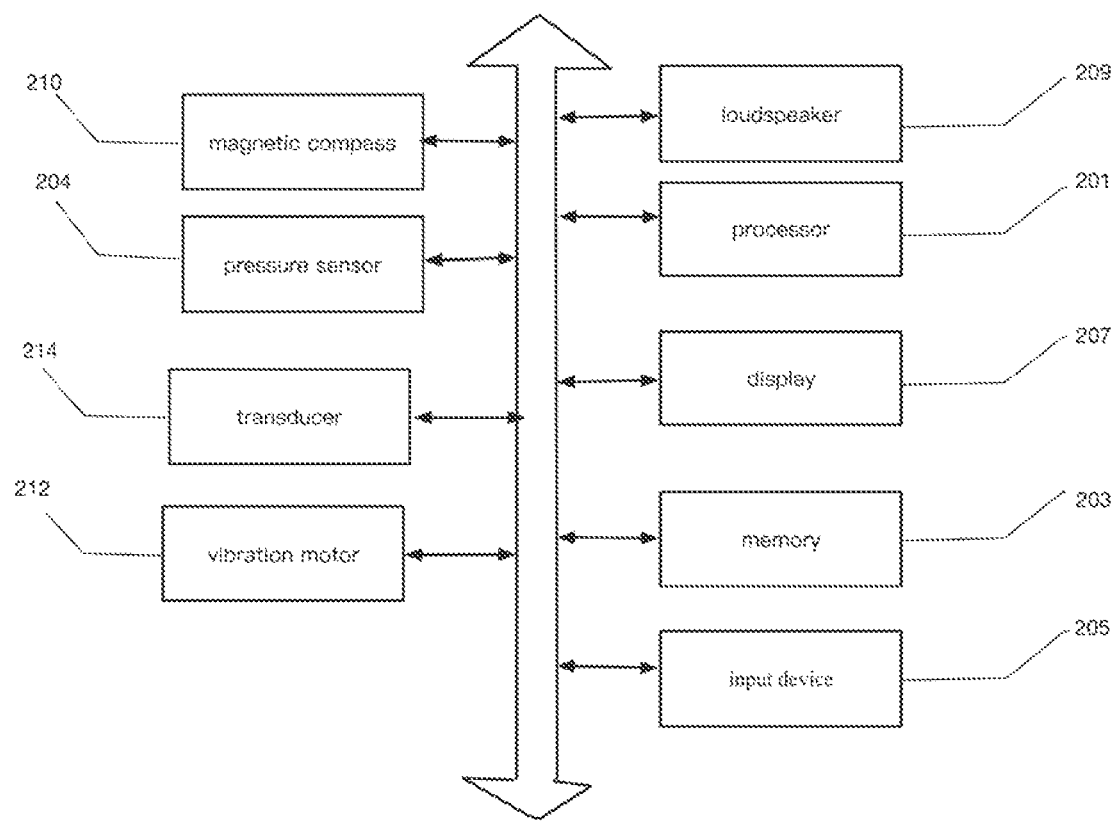

Referring to FIG. 3c, the shape of the slave device 20 and the master device 10 are substantially the same. In some other embodiments, the slave device 20 has similar components with the master device 10. In some other embodiment, the slave device 20 may omit some functional modules or devices in the master device 10, such as an attitude sensor. In this embodiment, the master device 10 and the slave device 20 are different, and the master device 10 has more functions than the slave device 20. At the result, the electronic device system 99 for diving can be configured with suitable functions according to different roles, without all having the same function, so that the electronic device system 99 for diving can solve the diving safety problem, and also can make the configuration of the electronic device system 99 for diving more optimized, saving costs. In some other embodiments, the slave device 20 and the master device 10 may be the same. It is understood that, in order to better describe the electronic devices for diving, the electronic devices for diving in the embodiment is called the master device 10 and the slave device 20, and in some other embodiments, the electronic device for diving can also be called but not limited to the first electronic device 10 and the second electronic device 20.

The control method of the electronic device system for diving will be described in detail below. The control method includes the control method performed in the master device 10 and the slave device 20, as well as the control method performed in the master device 10 and each slave device 20 independently. The master device 10 and the slave device 20 are all wearable devices, and the underwater environment is taken as an example.

Figure 5:
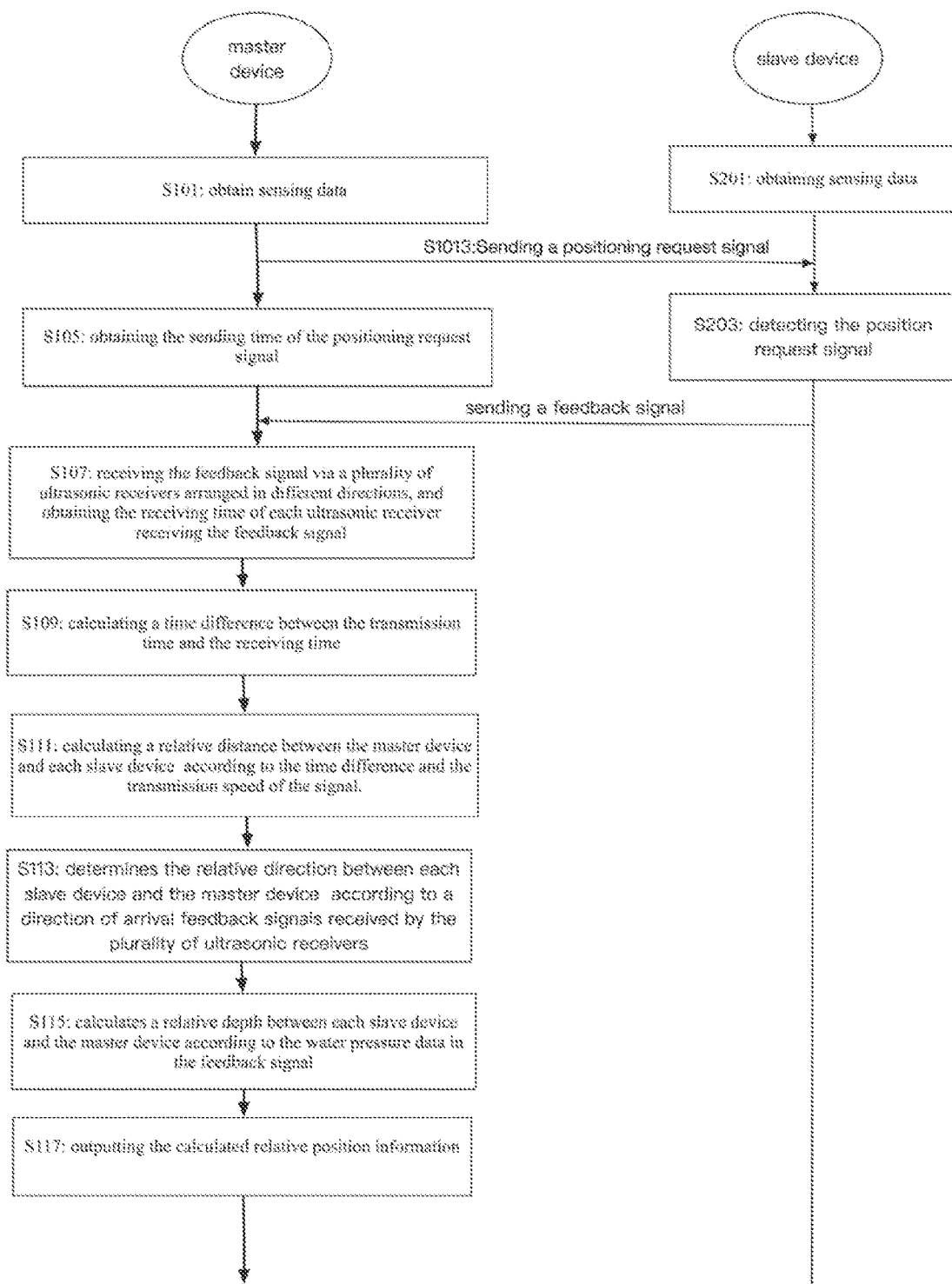
FIG. 5 illustrates the control method of the electronic device for diving in accordance with the first embodiment.

Referring to FIG. 5, FIG. 5 illustrates a control method of the electronic device system for diving provided by the first embodiment. The control method includes the following steps.

At step S101, the master device 10 obtains the sensing data. In detail, the master device 10 detects the water pressure data via the pressure sensor 104. The master device 10 detects the orientation data via the attitude sensor 106 and the magnetic compass 110, and obtains the water pressure data and orientation data in real time.

At step S201, the slave device 20 obtains the sensing data. In detail, the slave device 20 detects the water pressure data via the pressure sensor 204.

At step S103, the master device 10 sends a positioning request signal via the ultrasonic transmitting device 1140. In detail, the positioning request signal is an acoustic signal. The master device 10 transmits a positioning request signal at a preset time interval.

At step S203, the slave device 20 detects the positioning request signal from the master device 10, and the slave device 20 transmit a feedback signal in response to the positioning request signal when the positioning request signal is detected. The feedback signals include water pressure data, orientation data and other sensing data. Furthermore, the feedback signal also includes a positioning signal which can be more accurately recognized by the master device 10. In detail, the positioning signal uses special format, which is accurately made the master device 10 identify the received feedback signal without interference. In this embodiment, the ultrasonic signal is a broadband signal, and the frequency of the broadband signal is 30-40 KHz. Because the broadband signal time measurement is accurate and the communication rate is high, it is faster and more accurate to obtains the master device 10 and the slave device 20.

At step S105, the master device 10 obtains the sending time of the positioning request signal. In detail, when the positioning request signal is sent, the master device 10 records the sending time of the positioning request signal.

At step S107, the master device 10 receives the feedback signal via a plurality of ultrasonic receivers 1142 arranged in different directions, and obtains the receiving time of each ultrasonic receiver 1142 receiving the feedback signal. Obvious, when one of the slave devices 20 transmits a feedback signal, the feedback signal is received by the ultrasonic receivers 1142 of the slave device 20 is the strongest.

At step S109, the master device 10 calculates a time difference between the transmission time and the receiving time.

At step S111, the master device 10 calculates a relative distance between the master device 10 and each slave device 20 according to the time difference and the transmission speed of the signal. The signal transmission speed is the transmission speed of ultrasonic signal in water.

At step S113, the master device 10 determines the relative direction between each slave device 20 and the master device 10 according to a direction of arrival feedback signals received by the plurality of ultrasonic receivers 1142. When the slave devices 20 are located in different directions underwater, a strength of the feedback signal received by the receiver 142 can be configured to determine which ultrasonic receivers 1142 faced to each slave device 20 respectively. It is understood that, the orientation of each slave device 20 relative to the master device 10 (the direction of arrival feedback signals) can be determined by the strength of the feedback signal when the slave devices 20 are located in difference directions underwater.

At step S115, the master device 10 calculates a relative depth between each slave device 20 and the master device 10 according to the water pressure data in the feedback signal.

At step S117, the master device 10 outputs the calculated relative position information.

In the above embodiment, the master device 10 can calculate the relative position relationship with the slave device 20, such as the distance, the direction, the depth, and the diver wearing the master device 10 can know the condition of the diver wearing the slave device 20, so as to improve the safety of the divers.

Figure 6:
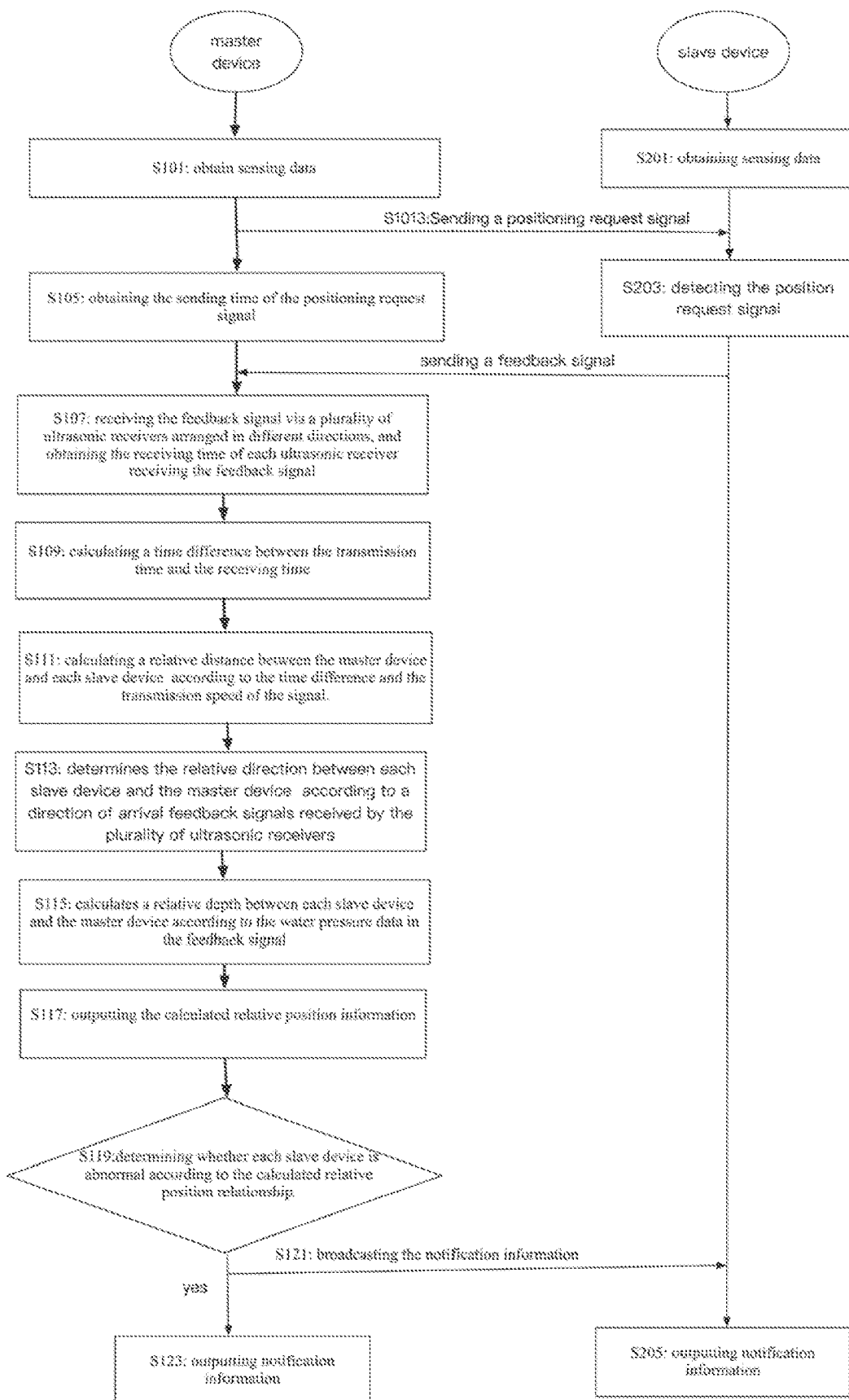
FIG. 6 illustrates the control method of the electronic device for diving in accordance with the second embodiment.

Referring to FIG. 6, FIG. 6 illustrates a control method of the electronic device system for diving provided by the second embodiment. The difference between the underwater control method of the second embodiment and the first embodiment is that the control method provided by the second embodiment further includes the following steps.

At step S119, the master device 10 determines whether each slave device 20 is abnormal or not according to the calculated relative position relationship. When each slave device 20 is abnormal, a step S121 is executed. In detail, the master device 10 determines whether the slave device 20 is abnormal or not according to the calculated relative distance or relative depth. When the calculated relative distance or relative depth between one of the slave devices 20 and the master device 10 exceeds threshold distance or depth, the master device 10 determines that the one slave device 20 is abnormal, otherwise, the one of the slave devices 20 is normal.

At step S121, the master device 10 broadcasts the notification information. The master device 10 transmits the corresponding notification information by broadcasting, and the notification information includes the abnormal information of the slave device 20, for example, the depth exceeds the threshold depth, the distance exceeds the threshold distance, and so on.

At step S123, the master device 10 outputs notification information. In detail, the master device 10 can output the notification information by displaying the prompt information, sending out the alarm sound, controlling the vibration of the vibration motor, etc., so as to prompt the diver wearing the master device 10 to understand the abnormal situation of the partner, so as to take rescue measures and improve the safety of diving.

At step S205, when the slave device 20 receives the broadcast notification information from the master device 10, the slave device 20 outputs the notification information. It is understood that after receiving the broadcast notification information, each slave device 20 can prompt the diver wearing the slave device 20 to know the abnormal situation of the partner by outputting the notification information such as displaying the prompt information on the display 207, utter alarm sounds via the loudspeaker 209, controlling the vibration motor 212 to make vibration, etc. So that the diver can take rescue measures and improve the safety of diving.

Figure 7:
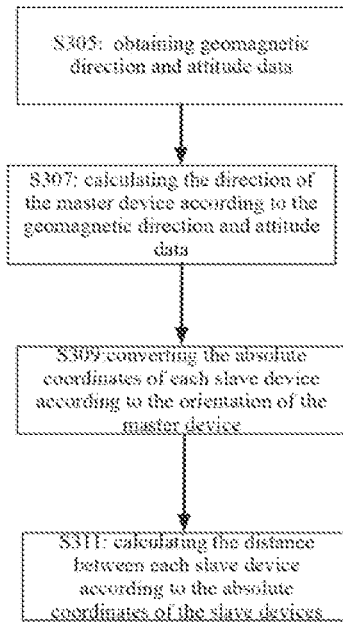
FIG. 7 illustrates the control method of the electronic device for diving in accordance with the third embodiment.

Referring to FIG. 7, FIG. 7 illustrates a flow diagram of a portion of the control method of the electronic device system for diving in the third embodiment. The difference between the control method of the electronic device for diving in the third embodiment and the first embodiment is that the following steps are also provided.

At step S305, the master device 10 obtains geomagnetic direction and attitude data. In detail, the master device 10 obtains the geomagnetic direction through the magnetic compass 110. The master device 10 detects the attitude data through the attitude sensor, such as gravity sensor. The attitude data may be but not limited to the gravity direction.

At step S307, the master device 10 calculates the direction of the master device 10 according to the geomagnetic direction and attitude data.

At step S309, the master device 10 converts the absolute coordinates of each slave device 20 according to the orientation of the master device 10, the relative position information between the master device 10 and each slave device 20. This absolute coordinate takes the origin of the geodetic coordinate as the origin of each slave device 20.

At step S311, the master device 10 calculates the distance between each slave device 20 according to the absolute coordinates of the slave devices 20.

In some other embodiments, the control method also includes that the master device 10 determines whether the distance between one of the slave devices 20 and the designated slave device 20 exceeds the threshold distance or not, and if so, broadcasts the notification information. In this way, the flexibility and safety of the electronic device system 99 for diving can be improved.

In some other embodiments, the control method also includes that the master device 10 outputs the absolute coordinates of each slave device 20, so that the diver wearing the master device 10 can know the position of each slave device 20.

In some other embodiments, the control method also includes that the master device 10 transmits absolute position coordinates of each slave device 20 to each slave device 20, so as to output the absolute position coordinates in each slave device 20. In this way, each slave device 20 needn't to calculate the absolute position coordinates by itself, so as to reduce the cost of the electronic device system for diving by saving the corresponding components and parts.

Figure 8:
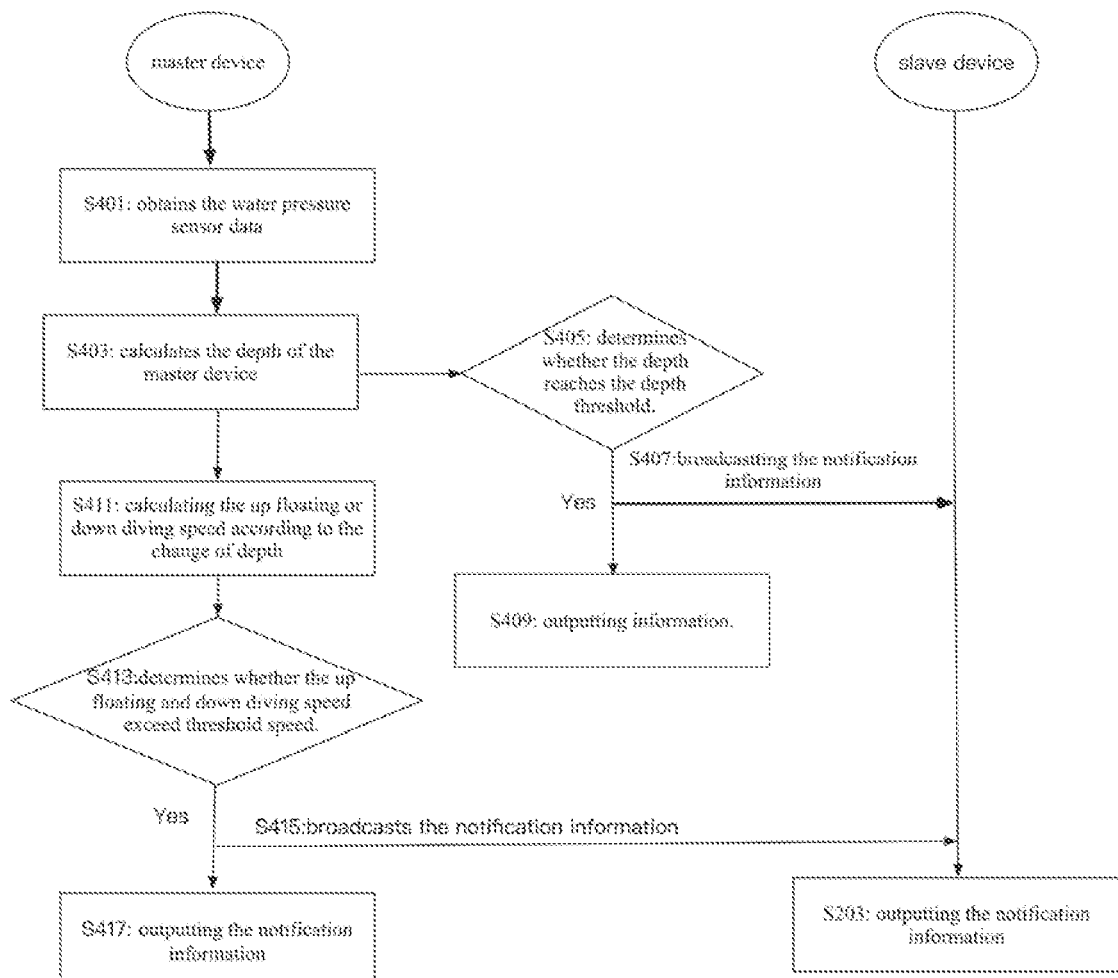
FIG. 8 illustrates the control method of the electronic device for diving in accordance with the fourth embodiment.

Referring to FIG. 8, FIG. 8 illustrates a flow diagram of a portion of the control method of the electronic device system for diving in the fourth embodiment. The difference between the control method of the electronic device for diving in the fourth embodiment and the first embodiment is that the following steps are also provided.

At step S401, the master device 10 obtains the water pressure sensor data. In detail, the master device 10 senses the water pressure data through the pressure sensor 104.

At step S403, the master device 10 calculates the depth of the master device 10 in water according to the water pressure data.

At step S405, the master device 10 determines whether the depth exceeds the depth threshold or not. When the depth of the master device 10 in the water exceeds the threshold depth, it indicates that the master device 10 is abnormal or dangerous, then a step 407 is executed.

At step S407, the master device 10 broadcasts the notification information. The master device 10 transmits the notification information by broadcasting, and the notification information includes the abnormal information of the slave device 20, such as the depth exceeds the threshold depth, the distance exceeds the threshold distance, and so on.

At step S409, the master device 10 outputs information. In detail, the master device 10 can output the notification information by displaying the prompt information, speaking out the alarm sound, controlling the vibration motor to work, etc., so as to prompt the diver wearing the master device 10 to know the abnormal condition of himself, so that he can take self-rescue or other rescue measures.

At step S203, when the slave device 20 receives the broadcast notification information from the master device 10, the slave device 20 outputs the notification information. It is understood that, after receiving the broadcast notification information, each slave device 20 can prompt the diver wearing the slave device 20 to know the abnormal situation of the partner through outputting the notification information such as displaying prompt information on the display 107, utter alarm sound via the loudspeaker 109, controlling vibration motor 112 to make vibration, etc. So that the diver can take rescue measures and improve the safety of diving.

At step S411, the master device 10 calculates the up floating or down diving speed according to the change of depth. In detail, the master device 10 can obtain the up floating or down diving speed according to the depth calculated at the two adjacent times and the time difference between the two adjacent times.

At step S413, the master device 10 determines whether the up floating or down diving speed exceeds threshold speeds or not. A step S415 is executed when the up floating or down diving speed exceeds threshold speed.

At step S415, the master device 10 broadcasts the notification information and the step S203 is executed. The master device 10 transmits the corresponding notification information by broadcasting, and the notification information includes the abnormal information of the slave device, such as the depth exceeds the threshold depth, the distance exceeds the threshold distance, and so on.

At step S417, the master device 10 outputs information. In detail, the master device 10 can prompt the diver wearing the master device 10 to know the abnormal situation of the partner by outputting the notification information such as displaying the prompt information, utter alarm sounds, generating vibration, etc. So that the diver can take rescue measures and improve the safety of diving.

In the above embodiment, when the master device 10 detects the abnormal condition of itself, it can broadcast the notification information to inform the partner for rescue or prompt the diver wearing the master device 10 for self-rescue.

Figure 9:
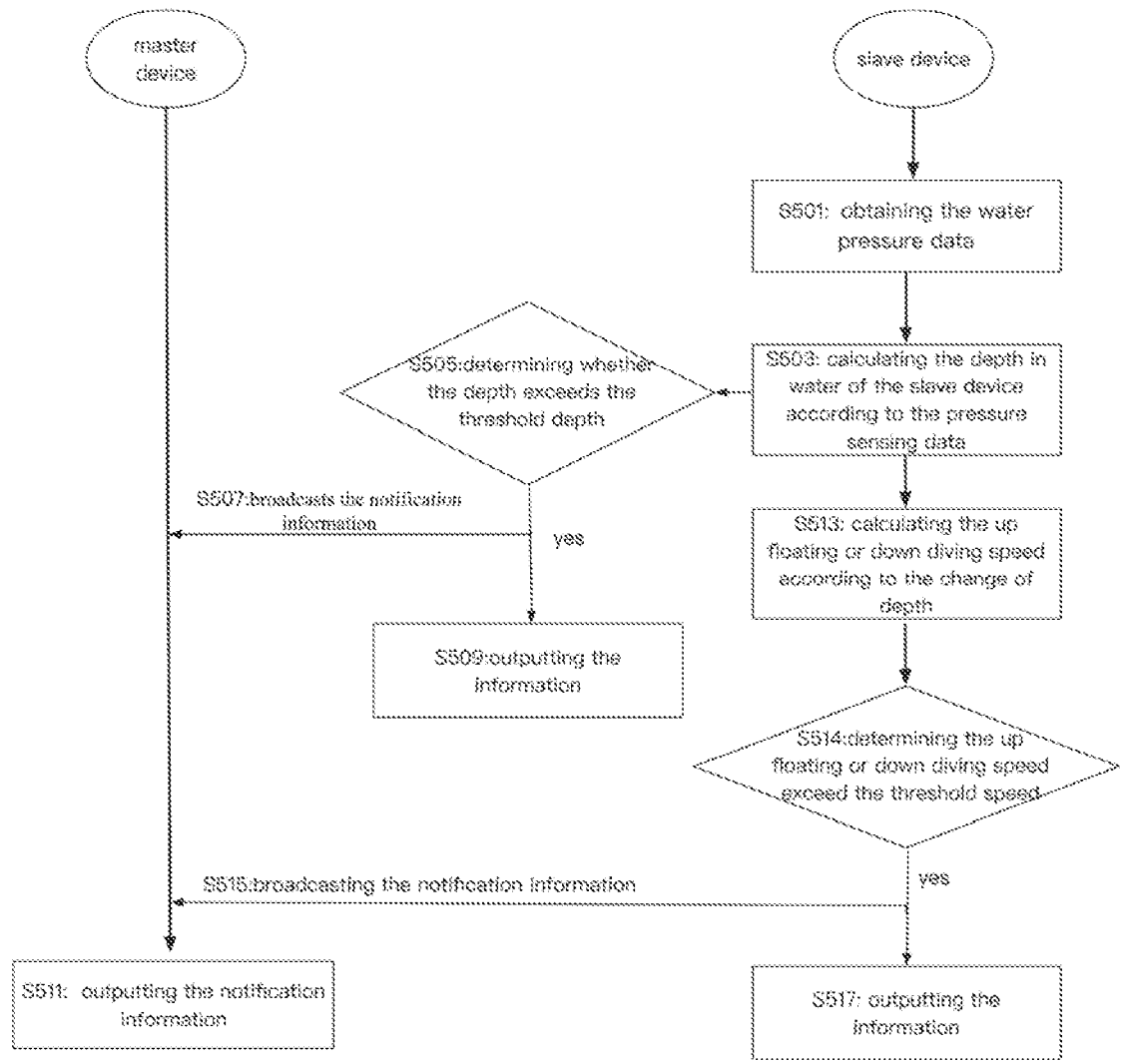
FIG. 9 illustrates the control method of the electronic device for diving in accordance with the fifth embodiment

Referring to FIG. 9, FIG. 9 illustrates a control method of the electronic device system for diving provided by the fifth embodiment. The difference between the underwater control method of the fifth embodiment and the first embodiment is that the control method provided by the fifth embodiment also includes the following steps.

At step S501, the slave device 20 obtains the water pressure data. In detail, the master device 10 senses the water pressure data through the pressure sensor 204.

At step S503, the slave device 20 calculates the depth in water of the slave device 20 according to the pressure sensing data.

At step S505, the slave device 20 determines whether the depth exceeds the threshold depth or not. When the depth of the slave device 20 in the water exceeds the threshold depth, it indicates that the slave device 20 is abnormal or dangerous, then a step 507 is executed.

At step S507, the slave device 20 broadcasts the notification information. The slave device 20 transmits the corresponding notification information by broadcasting, and the notification information includes the abnormal information of the slave device 20 such as the depth exceeds the threshold depth, the distance exceeds the threshold distance, and so on.

At step S509, the slave device 20 outputs the information. In detail, the slave device 20 can output the notification information by displaying the prompt information, sending out the alarm sound, controlling the vibration of the vibration motor, etc., so as to prompt the diver wearing the slave device 20 to know the abnormal condition of himself, so that he can save himself or take other rescue measures to improve the safety of diving.

At step S511, when the master device 10 receives the broadcast notification information from the slave device 20, the master device 10 outputs the notification information. It is understood that after receiving the broadcast notification information, other slave device 20 receives prompt the diver wearing the master device 10 to know the abnormal situation of the partner through outputting the notification information such as displaying the prompt information, sending out the alarm sound, controlling the vibration of the vibration motor and so on. So that the diver can take rescue measures and improve the safety of diving.

At step S513, the slave device 20 calculates the up floating or down diving speed according to the change of depth. In detail, according to the depth calculated by two adjacent times and the time difference between the two adjacent times, the slave device 20 can obtain the up floating or down diving speed.

At step S514, the slave device 20 determines the up floating or down diving speed exceed the threshold speed.

At step S515, the slave device 20 broadcasts the notification information and the step S511 is executed. The slave device 20 transmits the corresponding notification information by broadcasting, and the notification information includes the abnormal information of the slave device 20, for example, the depth exceeds the threshold depth, the distance exceeds the threshold distance, and so on. In some other embodiment, another slave device 20 receives the notification information broadcasted by the slave device 20 and outputs the notification information.

At step S517, the slave device 20 outputs the information. In detail, the slave device 20 can output the notification information by displaying the prompt information, sending out the alarm sound, controlling the vibration of the vibration motor, etc., so as to prompt the diver wearing the slave device 20 to know the abnormal situation of himself, so that he can take rescue measures and improve the safety of diving.

In the above embodiment, when the slave device 20 detects the abnormal condition of itself, the notification information can be broadcast to inform the partner to rescue or prompt the diver wearing the slave device 20 to rescue himself.

Referring again to FIG. 2 and FIG. 3a again, the electronic device for diving further includes a processor 101 and a memory 103.

In some other embodiment, processor 101 may be a Central Processing Unit (CPU), controller, microcontroller, microprocessor or other data processing chip for running program code or processing data stored in memory 11. In detail, the processor 12 can execute a control program to implement the above control method.

The memory 103 includes at least one type of readable storage medium. The memory 103 can not only be configured to store the application software and various kinds of data installed in the master device 10, such as the code of the control program, etc., but also be configured to temporarily store the data that has been or will be output.

It is understood by those skilled in the art that the structures shown in FIG. 2 and FIG. 3a do not constitute a limitation corresponding to the electronic device for diving, and may include fewer or more components, or combination of some components, or different component arrangements than those shown.

Those skilled in the art can clearly understand that in order to better describe, the specific working process of the system, device and unit described above can refer to the corresponding process in the embodiment of the method described above, and will not be described here.

In some embodiments, it should be understood that the above system, device and method described above can be realized in other ways. For example, the embodiment of the device described above is only schematic, such as the division of the unit is only a logical function division, and there can be another division method in actual implementation, for example, multiple units or components can be combined or integrated into another system, or some features can be ignored or not executed. On the other hand, the mutual coupling or direct coupling or communication connection shown or discussed can be indirect coupling or communication connection through some interfaces, devices or units, and can be electric, mechanical or other forms.

The unit described as a separation part may or may not be physically separated, and the component displayed as a unit may or may not be a physical unit, that is, it may be located in one place, or it may be distributed to multiple network units. Some or all of the units can be selected according to the actual needs to achieve the purpose of this embodiment.

In addition, each functional unit in each embodiment application may be integrated in one processing unit, each unit may exist physically alone, or two or more units may be integrated in one unit. The above integrated unit can be realized either in the form of hardware or in the form of software function unit.

It should be noted that the sequence number of the embodiment is only for description and does not represent the advantages and disadvantages of the embodiment. And the terms "include", "comprise" or any other variation thereof are intended to cover non-exclusive inclusion so that a process, device, article or method including a series of elements comprise not only those elements, but also other elements not explicitly listed, or elements inherent to such process, device, article or method. Without further restrictions, the element limited by the statement "include a . . . " is not exclude that there are other identical elements in the process, device, article or method including the element.

The above is only a preferred embodiment, and does not limit the scope of the patent of the disclosure. Any equivalent structure or equivalent process transformation made by using the contents of the description and the attached drawings of the disclosure, or directly or indirectly used in other related technical fields, are similarly included in the scope of patent protection of the disclosure.

Obviously, those skilled in the art can make various changes and modifications to the disclosure without departing from the spirit and scope of the disclosure. In this way, if these modifications and variations of the disclosure fall within the scope of the claims of the disclosure and its equivalent technology, the disclosure also intends to include these modifications and variations.

The above-mentioned examples are only the preferred embodiments, of course, the scope of the right of the disclosure cannot be defined by them. Therefore, the equivalent changes made according to the claims of the disclosure still belong to the scope of the disclosure.

The invention claimed is:

1. A control method of an electronic device system for diving, the electronic device system for diving comprising a master device and a slave device, the control method comprising:
   sending a positioning request signal to the slave device;
   receiving a feedback signal sent by the slave device, the feedback signal being generated by the slave device responding to the positioning request signal, the feedback signal comprising water pressure data;
   calculating a relative distance with the slave device according to the time difference between the sending time of the positioning request signal and the receiving time of the feedback signal, and the signal transmission speed;
   obtaining the relative direction between the slave device and the master device according to a direction of arrival feedback signal; and
   calculating the relative depth with the slave device according to the water pressure data in the feedback signal.

2. The control method of claim 1, further comprises:
   outputting corresponding relative position information comprising at least one of the relative distance, the relative direction, and the relative depth.

3. The control method of claim 1, wherein the feedback signal and the positioning request signal are broadband signals.

4. The control method as claimed in claim 3, wherein the broadband signals is 30-40 KHz.

5. The control method of claim 1, wherein the control method further comprises:
   determining whether the master device is abnormal or not according to the relative position information; and broadcasting the notification information to control the slave device to output the notification information, if the master device is abnormal.

6. The control method of claim 5, wherein the control method further comprises:
outputting the notification information, if the master device is abnormal.

7. The control method of claim 1, further comprises:
obtaining geomagnetic direction and attitude data;
calculating the orientation of the master device according to the geomagnetic direction and the attitude data; and
calculating the absolute coordinate of the slave device according to the orientation of the master device, the relative position information between the master device and the slave device.

8. The control method of claim 7, further comprises:
sending absolute coordinate information to the slave device to control the slave device to output the absolute coordinate information.

9. An electronic device for diving, the electronic device being the master device, the master device comprises:
a transducer, comprising an ultrasonic transmitter and a plurality of ultrasonic receivers;
a memory configured to store programs; and
a processor configured to execute the programs to perform:
sending a positioning request signal to the slave device via the ultrasonic transmitter;
receiving a feedback signal sent by the slave device via the plurality of the ultrasonic receivers, the feedback signal being generated by the slave device responding to the positioning request signal, the feedback signal comprising water pressure data;
calculating a relative distance with the slave device according to the time difference between the sending time of the positioning request signal and the up floating or down diving speed of the feedback signal, and the signal transmission speed;
obtaining the relative direction between the slave device and the master device according to a direction of arrival feedback signal; and
calculating the relative depth with the slave device according to the water pressure data in the feedback signal.

10. The electronic device of claim 9, wherein the processor further configured to execute the programs to perform:
outputting corresponding relative position information comprising at least one of the relative distance, the relative direction, and the relative depth.

11. The electronic device of claim 9, wherein the feedback signal and the positioning request signal are broadband signals.

12. The electronic device of claim 10, wherein the broadband signals is 30-40 KHz.

13. The electronic device of claim 9, wherein the processor further configured to execute the programs to perform:
determining whether the master device is abnormal or not according to the relative position information; and
broadcasting the notification information to control the slave device to output the notification information, if the master device is abnormal.

14. The electronic device of claim 13, wherein the processor further configured to execute the programs to perform: outputting the notification information, if the master device is abnormal.

15. The electronic device of claim 9, wherein the processor further configured to
execute the programs to perform:
obtaining geomagnetic direction and attitude data;
calculating the orientation of the master device according to the geomagnetic direction and the attitude data; and
calculating the absolute coordinate of the slave device according to the orientation of the master device, and the relative position information between the master device and the slave device.

16. The control method of claim 15, wherein the processor further configured to
execute the programs to perform:
sending absolute coordinate information to the slave device to control the slave device to output the absolute coordinate information.

17. An electronic device system for diving, comprising
a slave device, and
a master device, the master device comprising:
a transducer, comprising ultrasonic transmitter and a plurality of ultrasonic receivers;
a memory for storing programs; and
a processor for executing the programs to perform steps of:
sending a positioning request signal to the slave device via the ultrasonic transmitter;
receiving a feedback signal sent by the slave device via the plurality of the ultrasonic receivers, the feedback signal being generated by the slave device responding to the positioning request signal, the feedback signal comprising water pressure data;
calculating a relative distance with the slave device according to the time difference between the sending time of the positioning request signal and the receiving time of the feedback signal, and the signal transmission speed;
obtaining the relative direction between the slave device and the master device according to a direction of arrival feedback signal; and
calculating the relative depth with the slave device according to the water pressure data in the feedback signal.

* * * * *